April 14, 1942.  H. W. SMITH  2,279,530
MEANS FOR PREPARING A COMBUSTIBLE FUEL
Filed Aug. 13, 1938  6 Sheets-Sheet 1

INVENTOR
HAROLD W. SMITH

ATTORNEY

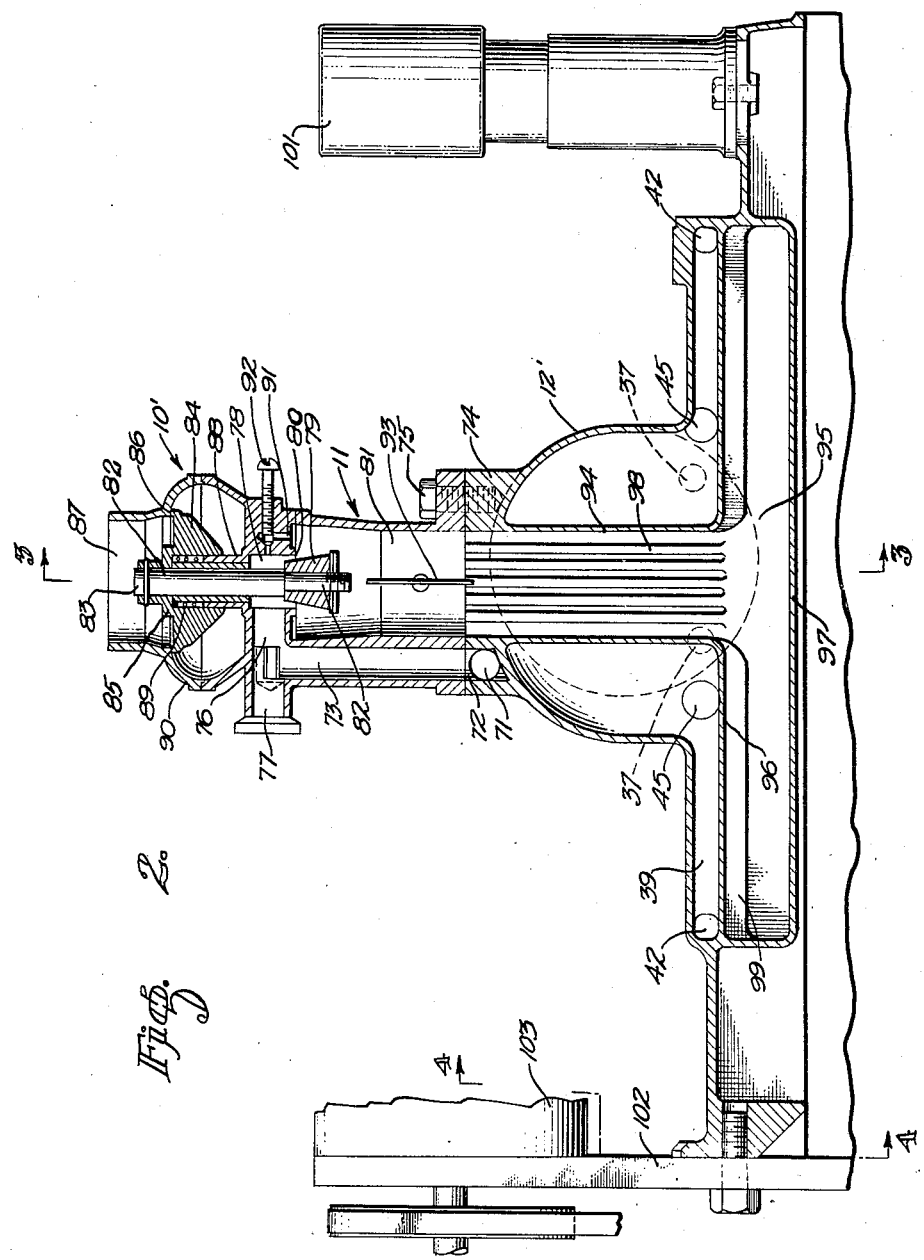

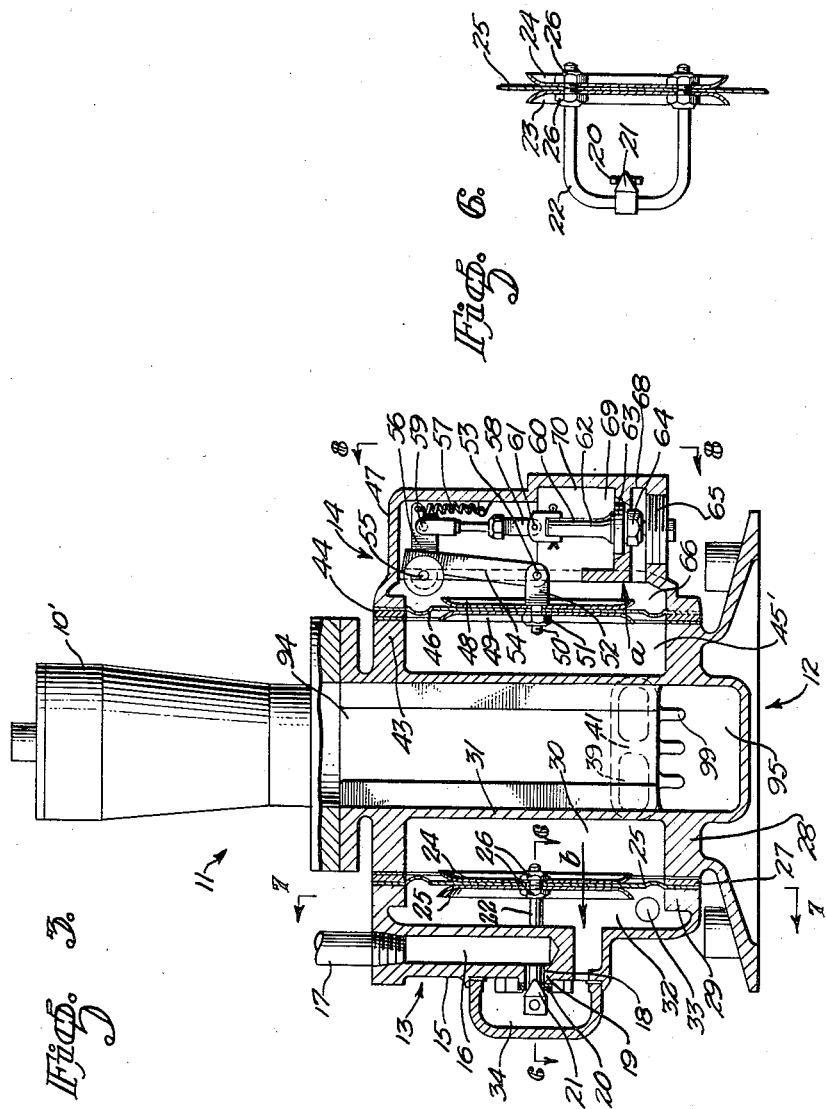

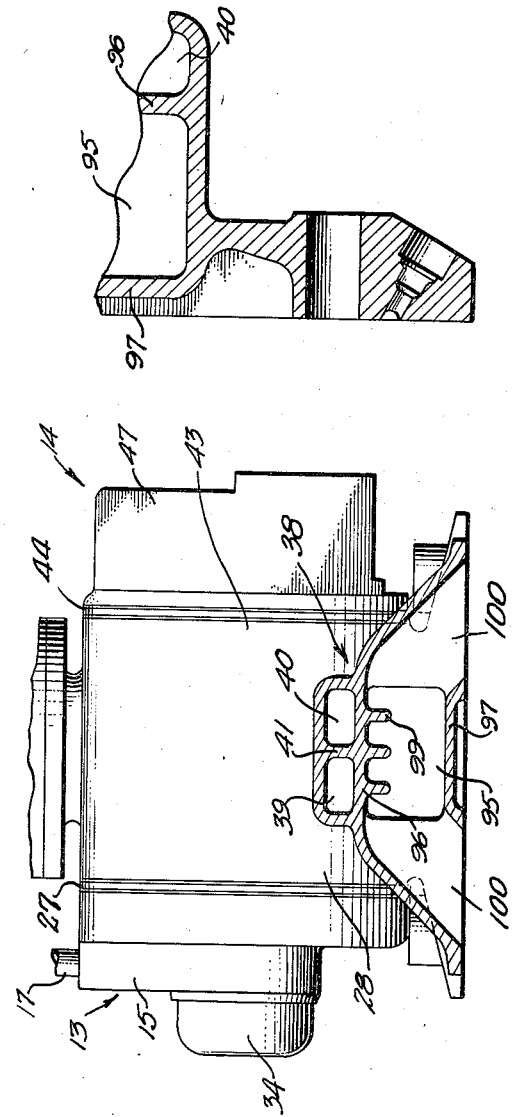

April 14, 1942.   H. W. SMITH   2,279,530
MEANS FOR PREPARING A COMBUSTIBLE FUEL
Filed Aug. 13, 1938   6 Sheets-Sheet 5

INVENTOR
HAROLD W. SMITH
BY
ATTORNEY

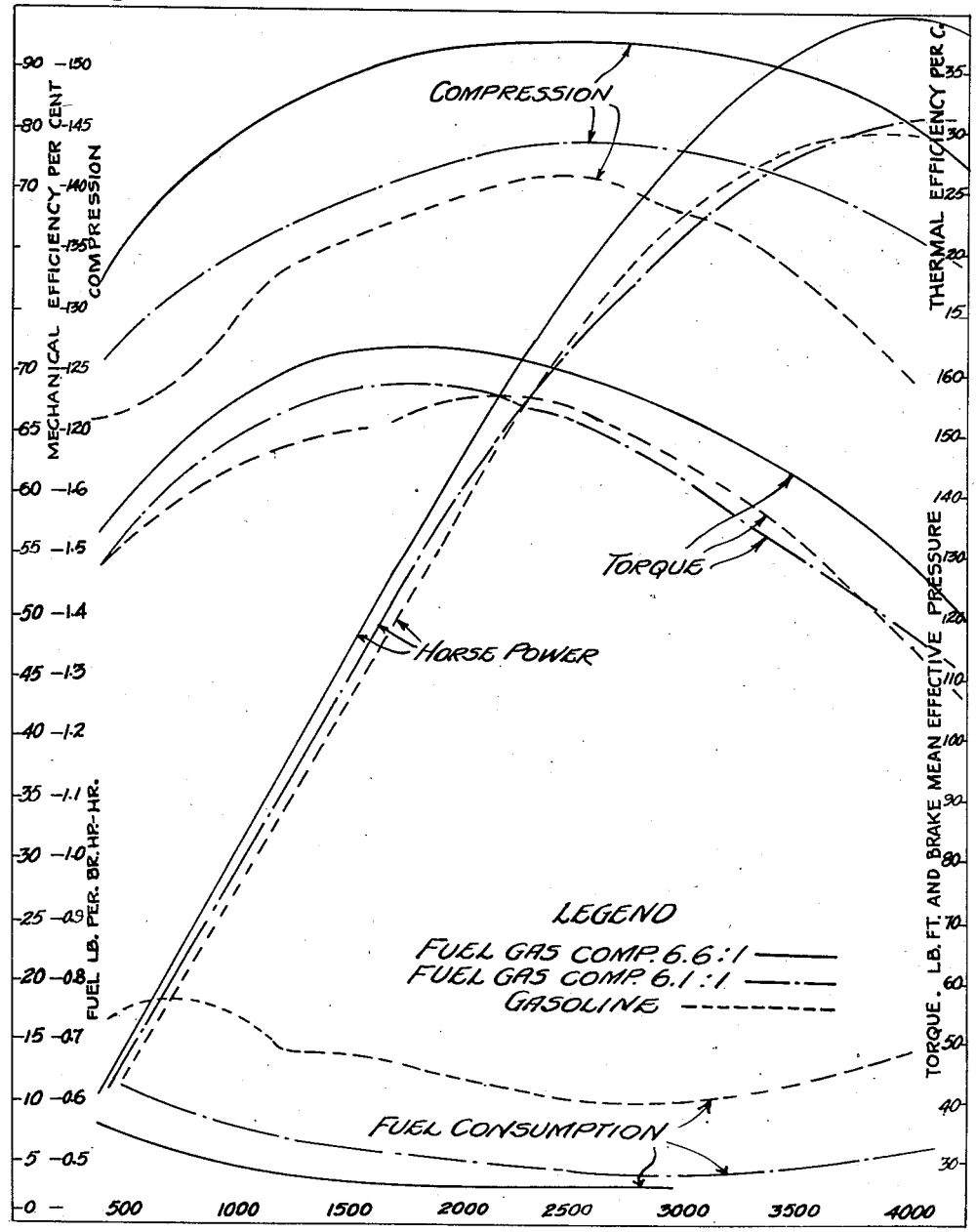

Patented Apr. 14, 1942

2,279,530

UNITED STATES PATENT OFFICE 2,279,530

MEANS FOR PREPARING COMBUSTIBLE FUEL

Harold W. Smith, Los Angeles, Calif., assignor, by mesne assignments, to American Liquid Gas Corporation, Los Angeles, Calif., a corporation of California Application August 13, 1938, Serial No. 224,718

5 Claims. (Cl. 48—180)

This invention relates to internal combustion engines and particularly pertains to an engine within which liquefied gases are used, and is especially concerned with a method and means of preparing a combustible fuel.

At the present time considerable experimental and development work is being carried on in the field of internal combustion engine design in which liquefied gases are used as a fuel, these gases being the hydrocarbons known as butane and propane, and having the characteristic of being in a liquefied state while confined under pressure and in a gaseous state when liberated. It has also been found that the value of such gases as a fuel for internal combustion engines lies in the control of the pressure and the control of the heat absorption, whereby the gas will have an efficient burning action under pressure and will create a production of horse-power comparable to and in many instances in excess of the horse-power derived from the use of internal combustion engines using the conventional types of liquid fuel.

It has also been found desirable to provide means for supplying and regulating the supply and temperature and fuel of the liquid gas type for use in internal combustion engines of conventional type and design without requiring modification or alteration in the engine structure, and whereby efficient fuel combustion will be obtained.

It is the principal object of the present invention, therefore, to provide means for conducting a flow of gaseous fuel derived from a liquefied gas and supplying the same to an internal combustion engine of conventional design, and within which means for conduction the release and flow of the gaseous fuel is automatically controlled and a desired heat exchange condition is set up, whereby the gaseous fuel will be maintained at an optimum temperature for combustion after having been compressed within the head of an engine cylinder.

The novelty and usefulness of this invention lies in the fact that heretofore it has not been possible to obtain the same power from natural or liquid gas that has been possible from gasoline when used in an engine having the same compression ratio. In other words it has always been found necessary to change an engine so as to allow for a higher compression ratio in order to obtain the equivalent or more horse power. This invention provides the means which overcome the fundamental reasons why reduced power has resulted from the use of liquid gas in place of gasoline. With a fixed gas it has been impossible to provide the weight of charge for the cylinders and therefore the heat content of the charge is lower than a charge produced by the mixture of liquid fuel and air. This is true because the heat content in a cubic foot of liquefied gas is less than the heat content in a cubic foot of gasoline vapor. The novelty in this invention consists of utilizing the latent heat of evaporization to so cool down the gas air mixture to such a point that a sufficient amount of combustible mixture will be admitted to the cylinder to equal or better the heat content produced in a gasoline air mixture. With gasoline air mixture it is necessary to heat the charge in order to get good distribution and a certain degree of vaporization for good engine operation. With a mixture of butane and propane and air a homogenous charge is provided which does not change with the temperature. This being true, it is practical to cool this mixture to a point whereby the volumetric efficiency of the cylinder will be very much higher than that which it is possible to secure with a liquid fuel mixture. The novelty of this invention is that the cooling of the charge by means of the refrigeration produced during the process of the liquid gas changing to a dry gas, to our knowledge has not been done before.

The present invention contemplates the provision of a unitary manifold and valve structure to which a liquefied gaseous fuel is delivered, within which it is liberated to produce a desired gas and a proper carburated mixture, and through which it flows under heat transfer conditions, insuring that a relatively cool gaseous charge will be delivered to the engine cylinder for explosive purposes.

The invention is illustrated by way of example in the accompanying drawings, in which—

Fig. 2 is a view in central vertical section through the manifold structure, as seen on the line 2—2 of Fig. 1, and shows the application of a gas-air mixer to the manifold.

Fig. 3 is a view in transverse section through the valve structure of the present invention, as seen on the line 3—3 of Fig. 2.

Fig. 4 is a view in section and elevation, as seen on the line 4—4 of Fig. 2, and discloses the relationship of the valve structure and the manifold passageways.

Fig. 5 is a fragmentary view in section showing a portion of the manifold construction.

Fig. 6 is a view in elevation showing one of the valve operating mechanisms, as seen on the line 6—6 of Fig. 3.

Fig. 9 is a view in diagram showing the relative performance of liquefied gas fuel and commercial gasoline, as demonstrated by actual block tests.

Figure 1:
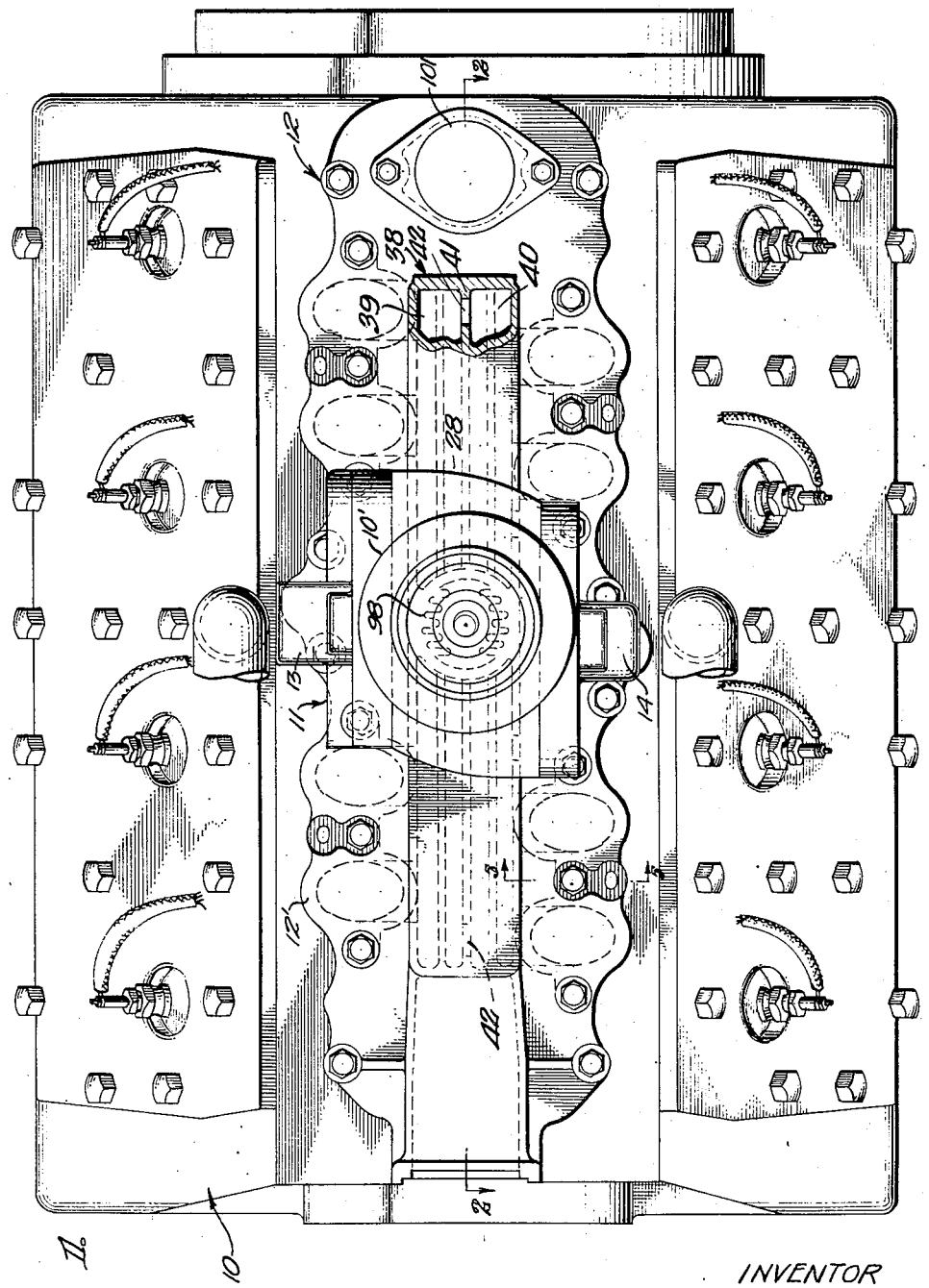
Figure 1 is a view in plan showing the present invention as being applied to an engine of conventional type and design, the engine as here shown being of the V-type.

Referring more particularly to the drawings, 10 indicates an internal combustion engine, here shown as having a V-type cylinder block between which a bolting flange occurs, and upon which cylinder block the manifold and valve unit 12 embodying the present invention is disclosed.

It is to be understood that the prime object of the present invention is to provide a unitary manifold and valve structure which may be interchanged or added to with the conventional manifold structure of an internal combustion engine to permit a fuel derived from liquefied gas to be used in the engine without further change or alteration.

Referring more particularly to Fig. 2 of the drawings, 10' indicates an air-gas mixer mounted upon an adapted 11, which establishes communication between the air-gas mixer and the manifold 12'. The air-gas mixer 10' may be of any preferred design, although the details of the mixer here shown will be subsequently described. The manifold 12' embodies the essential elements of the present invention and is associated with a first stage valve unit 13 and a second stage valve unit 14, more particularly disclosed in Fig. 3 of the drawings.

The units 13 and 14 are here shown as disposed substantially midway the length of the manifold. It is to be understood, however, that these units may be positioned as desired without departing from the spirit of the invention as claimed. The first stage unit comprises a housing structure 15 formed with a vertical well 16 therein. This well communicates at its upper end with a fuel delivery pipe 17 through which liquid gas under a suitable pressure is carried to the well 16. In the side wall of the well 16 adjacent its lower closed end is an eduction port 18 which communicates with the well 16 and extends outwardly through a boss 19. Mounted within the boss 19 and disposed at the end of the port is an annular valve seat 20, which is preferably made of ductile metal to receive a conically pointed valve element 21.

The valve seat 20 is designated in Fig. 6 of the drawings with the valve element 21 in a seated position. The valve element 21 is carried by a U-shaped supporting arm 22 which extends around opposite sides of the well structure 16 in a horizontal plane and passes through retainer plates 23 and 24, which are disposed upon opposite sides of a diaphragm 25. Suitable fastening nuts 26 are provided to adjust and hold the threaded ends of the member 22 in assembled relation to the plates 23 and 24 and the diaphragm 25. The marginal edge of the diaphragm is circular and seats upon a ring 27, here shown as in the form of a steel sealing plate. This plate in turn rests against an annular portion 28 of the manifold structure 12', the central axis of which annular portion extends horizontally and the outer plane face of which lies in a vertical plane to receive the seating ring 27. The housing structure 15 is annular and has an annular flange 29 agreeing in outer diameter and in end face width to that of the annular portion 28. This flange abuts against and cooperates with the ring 27 in gripping the marginal edge of the diaphragm 25 and in causing a compression chamber 30 to be formed between the vertical wall 31 of the manifold and the diaphragm 25 on one side and a pressure chamber 32 to be formed within the housing structure 15 and upon the opposite side of the diaphragm 25. In communication with the chamber 32 there is a suction port 33 which will cause the diaphragm 25 to flex in an outward direction and to in turn cause the valve 21 to be lifted from its seat. It will be recognized that the type of valve comprising the seat 20 and the valve element 21 are such as to prevent them from freezing and to permit them to instantly respond when the diaphragm 25 is flexed. The outer end of the chamber 32 is closed and the valve structure is housed by a cover cap 34 which is suitably mounted upon the structure 15.

Figure 7:
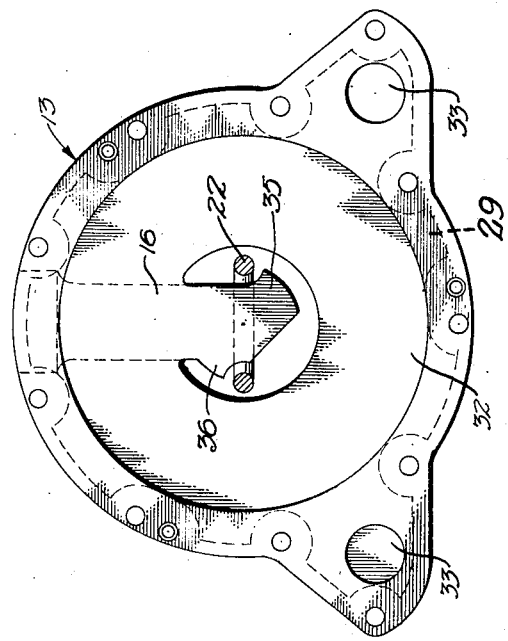
Fig. 7 is a view in elevation showing the diaphragm structure as mounted within the housing and as seen on the line 7—7 of Fig. 3.

By reference to Fig. 7 it will be seen that the well structure is formed with lugs 35 and 36 which tend to guide the yoke 22 as the diaphragm 25 flexes.

As shown in Fig. 7 of the drawings, the chamber 32 communicates with ports 33. These ports in turn communicate with passageways 37 indicated by dotted lines in Fig. 2 of the drawings. The passageways lead into a manifold structure, generally indicated at 38 in Fig. 4, and which manifold structure is formed with parallel passageways 39 and 40 divided by an intermediate partition 41. As shown in the plan view of the manifold (see Fig. 1) the intermediate partition 41 is formed with openings 42 at its opposite ends. These openings permit the gases to flow from the single stage unit 13 lengthwise of the manifold structure and then to pass through the openings 42 from the manifold passageway 39 into the manifold passageway 40. By this arrangement a relatively long path of travel will be provided for the incoming gas from the first stage structure 13 to the second stage structure 14.

The second stage structure 14 comprises an annular housing 43 agreeing substantially in size and provides for the same function as the portion 28, previously described as forming a part of the first stage unit. An annular seating ring 44 is mounted around the outer lip of this housing and a compression chamber 45' is formed within the housing by a diaphragm 46 which is mounted on the seating ring. An outer housing element 47 is provided and is clamped against the circumferential margin of the diaphragm 46 to hold it in an operative position. The diaphragm 46 is provided with plates 48 and 49 which are clamped together by a screw 50 and a nut 51. The screw 50 is carried upon a fitting 52 and is pivotally connected by a pin 53 to a lever arm 54. The lever arm 54 is mounted upon a pivot 55 and this in turn carries a valve lever 56 which is yieldably held in its lowermost position by valve spring 57. An adjustable shackle bolt 58 is pivoted to the valve lever at 59 and is pivoted to a link structure 60 by a pin 61. The link structure carries a valve stem 62, upon which is mounted a valve member 63. A nut 64 holds the valve member 63 in position. A removable plug 65 which is threaded into the housing 47 permits access to the valve structure.

Figure 8:
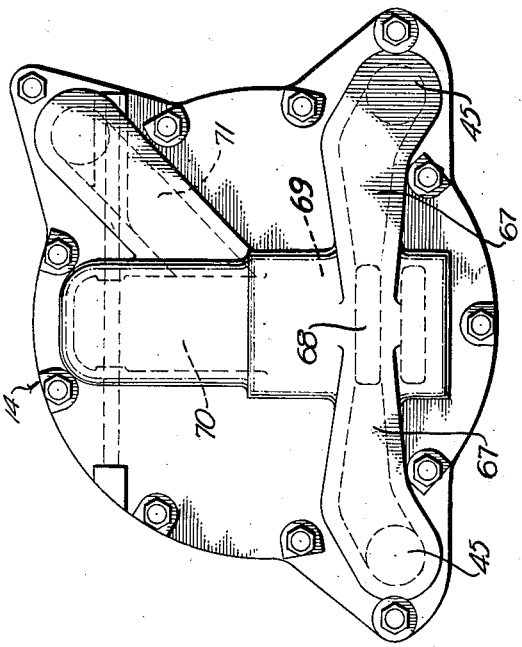
Fig. 8 is a view in end elevation showing the valve housing arrangement as seen on the line 8—8 of Fig. 3.

Formed within the housing 47 and sealed by the diaphragm 46 is a suction chamber 66. This suction chamber communicates with the passageways 45 which lead from the manifold passageway 40. The passageways 45, as particularly shown in Fig. 8 of the drawings, are in communication with passageways 67 which lead to the space 68 in the housing 47 and below the valve seat partition 69 with which the valve 63 cooperates. Above the partition 69 within the housing 47 is a passageway 70. This passageway is in communication with an outlet passageway 71 which communicates with a vertical port 72. The vertical port 72 is in register with a vertical passageway 73 formed longitudinally of the adapter 11, and when the adapter is bolted down upon the bolting flange 74 of the manifold structure and is held by cap screws 75, the passageways 72 and 73 will be in register.

The passageway 73 communicates with the laterally extending gas inlet 76, the outer end of which is closed by a plug 77. Disposed at the inner end of the gas inlet passageway 76 is a chamber 78 into which the gas may pass. The lower end of this chamber is normally closed by a cone-shaped valve element 79 which seats at 80. This valve element is disposed centrally of the adapter 11 at the upper end of a mixing passageway 81. The valve element 79 is mounted upon a pin 82 which extends outwardly and has an extension portion 83 fastened to a weight element 84 formed with an upper lip 85 normally seated against the under face of a valve ring 86. This valve ring is disposed around an air inlet throat 87. The stem 83 is mounted to reciprocate vertically within a valve guide 88 which is formed as a part of the air mixer housing. The weight 84 and the valve member 79 are held in their uppermost positions by a spring 89, which is disposed between the upper end of the guide 88 and a shoulder within the weight structure 84. A suitable bell-shaped housing 90 is formed as a part of the structure and communicates with the throat 87. This bell-shaped housing provides an air passageway entirely around the member 84. It is to be understood that the gas inlet passageway 76 extends radially of the structure but does not form a partition across the bottom of the housing 90 so that it is possible for air to be drawn downwardly through the housing 90 and into the air mixing passageway 81 before the valve 79.

A suitable bypass port 91 is formed in the wall of the housing 90 upon the opposite side from the passageway 76 and carries an adjusting screw 92. Mounted in the mixing throat 81 is a butterfly valve 93. The mixing throat 81 into which air from the air throat 87 and gas from the gas inlet passageway 76 are mixed is in communication with a vertically and downwardly extending intake manifold passageway 94 which projects downwardly and in turn communicates with a gaseous fuel distributing passageway 95 forming a part of the manifold structure shown particularly in Fig. 4 of the drawings. The gas distributing passageway 95 is defined by an upper wall 96 which extends horizontally and separates the passageway 95 from the passageways 39 and 40 through which the gas passes from its first stage unit to the second stage unit. The lower wall of the passageway 95 is defined by a wall 97 which is parallel to the wall 96 and extends for a suitable length therebeneath.

Projecting from the inner face of the passageway 94 is a plurality of longitudinally extending ribs 98. These ribs extend inwardly and are arranged parallel to each other, as indicated by dotted lines in Fig. 1 of the drawings.

Extending longitudinally of the passageway 95 and depending from the wall 96 is a plurality of similar ribs or fins 99 which project downwardly and are parallel to each other, as indicated particularly in Fig. 4 of the drawings. At appropriate points throughout the length of the passageway 95 are distributing passageways 100 which extend outwardly and downwardly and fit over the fuel intake ports of the engine valve structure.

Mounted at one end of the manifold structure, as shown in Fig. 2, is an appropriate connection for an engine breather 101 and at the opposite end is an appropriate connection for the bracket 102 of the engine generator unit 103.

In operation of the present invention the manifold and valve structure is constructed and assembled, as shown in the drawings. The adapter 11 is bolted in place by the cap screws 75 and the air mixing device is disposed above the adapter and in communication therewith. When the engine is started suction is exerted through the various engine cylinders and the manifold openings 100 and into the gaseous fuel passageway 95. This suction will act to draw downwardly upon the valve element 79 and against the compression of spring 89 so that the valve element 79 will tend to move from its seat 80. The amount of suction created will be controlled by the butterfly valve 93, which is optionally adjusted by the operator. As the valve 79 is drawn down, suction pressure will also be exerted within the housing 90 to draw downwardly upon the weighted member 84, thus moving the face 85 of this member away from the sealing face 86 at the bottom of the air intake throat 87. At the same time suction will be exerted through the gas inlet passageway 76 and the gas uptake passageway 73 from the passageway 71 which communicates with the chamber 70 occurring within the end of the housing structure 47 of the second stage valve 14. This suction will act upon the second stage diaphragm 46 to flex the diaphragm in the direction of the arrow $a$, as indicated in Fig. 3, which in turn will swing the lever arms 54 and 56 to lift the valve element 63 from its seat. As the valve element 63 is lifted from its seat in direct resistance to the suction exerted by the engine through the course previously described, communication will be established between the passageway 70 and the passageway 68. This passageway 68 is in communication with the two lateral passageways 67, as particularly shown in Fig. 8, and will exert suction pressure through the ports and passageways 45 leading to the ports 33 in the housing 15 of the first stage valve structure.

When suction is exerted within chamber 32 of the first stage valve structure the diaphragm 25 of that device will be flexed outwardly in the direction of the arrow $b$, and this will raise the valve element 21 from its seat 20 to establish a suction flow of fluid from the liquid gas well 16 through the passageway and thence into the chamber 32. It will thus be seen that due to this arrangement the liquid gas under its predetermined pressure will be led into the well 16 from the conduit 17 and will be released in metered flow through the valve passageway 20 and into the chamber 32. Due to the fact that this chamber is of relatively large volumetric capacity as compared with the area of the conduit 17 the liquefied gas will have an opportunity to expand and to gasify. This liquefied gas thus expanded in its first stage is then drawn through the ports 33. It is to be pointed out that in transit of the gaseous fuel from the first stage unit to the second stage unit through the chambers 32 and 45' the gas is taken along a tortuous path of travel through passageway 39 of the manifold, then through the openings 42 in the partition 41 and thence along the passageway 40 of the manifold to the chamber 66 of the second stage valve unit 14. During this transit additional expansion of gas takes place and as the gas is released from the chamber 66 and the chamber 70 additional expansion will take place. It will be seen that due to this arrangement the expansion will not be violent but progressive and the exchange of heat will be relatively gradual and controlled. It will further be noted that by reference to Fig. 2 of the drawings, that as the relatively cold gases are drawn into the upper manifold structure which includes the passageways 39 and 40 that they will pass in counter flow and in heat-exchange relationship to the gaseous fuel mixture which passes downwardly through the mixing throat 81 and the passageway 94 to the distributing manifold passageway 95 and thence along this passageway to the various manifold outlets 100. Since the passageways 94 and 95 are provided with heat radiating fins it is insured that the gaseous fuel will be delivered to the individual engine cylinders at a minimum temperature, thereby insuring that the most efficient explosive action is obtained by the gaseous charges which are drawn into the cylinders. It will also be evident that by this arrangement the control of the flow of the liquefied gas and the gaseous fuel is directly established and interrupted by the suction of the engine in an automatic operation and that the expansive action of the gas is controlled at all times by its own volumetric change. It is also to be noted that the valve structure of the first stage unit 13 is simple in construction, does not require any springs for its operation and insures that at the instant suction is interrupted within the engine the expansive action of the gas and liquid entrapped within the chamber 32 will tend to close the valve 21 automatically.

By reference to the graph shown in Fig. 9 of the drawings comparative performance between gasoline and liquid gas as developed in actual tests is disclosed. In such tests the engine was not in any wise conditioned save to remove the normal fuel supply system including the manifold and to substitute the structure here shown in lieu thereof. The tests were made on an 8-cylinder engine having a 3 1/16" bore, a stroke of 3 3/4" and a displacement of 221 cubic inches. It will thus be seen that by the use of a liquid gas fuel the fuel consumption ratio was lowered while producing an engine of a relatively quick pick-up and developing a desired power output. It is to be understood expressly that this invention is not confined to the particular type of manifold here shown or the number of cylinders and their arrangement, but may be adapted to any internal combustion engine.

It will thus be seen from an examination of the invention here disclosed that the manifold and gas structure provides a simple and effective means of conditioning and preparing liquefied gas as a fuel in combustion engines without requiring any revolutionary principles in engine design as present in the usual commercial types of engines.

While I have shown the preferred apparatus and the preferred method of operating the same, it is to be understood that various changes may be made in the combination, construction and arrangement of parts and the steps of the method by those skilled in the art without departing from the spirit of the present invention as here disclosed.

Having thus described my invention, what I claim and desire to secure by Letters Patent is:

1. In combination with a source of fuel characterized as being a liquid when under compression and a gas when released, a conduit through which the fuel passes from the source to apparatus designed for its use, which conduit includes means for permitting multiple stage expansion of the gas, means associated therewith for admitting air to said gas after passing the last stage of expansion and for conducting said gaseous mixture to the apparatus, and a conduit being provided with passageways whereby the expanding gas and the gaseous mixture may flow in heat-exchange relationship to each other.

2. In combination with a liquefied gas supply, means for gasifying said liquid and forming a fuel gas therefrom comprising a conduit in communication with the source of liquefied gas supply and in communication with apparatus designed for its use, a first expansion chamber into which said liquefied gas may be introduced, a valve controlling the introduction of liquefied gas thereinto, a second expansion chamber in communication with the first expansion chamber, a valve therein controlling the introduction of gas from the first expansion chamber, and means for introducing air into the gas as it travels from the second expansion chamber to the apparatus, said gas and air mixture being in counter-flow and heat-exchange relationship to the gas passing from the first expansion chamber to the second expansion chamber.

3. In combination with a liquefied gas supply, means for gasifying said liquid and forming a fuel gas therefrom comprising a conduit in communication with the source of liquefied gas supply and in communication with apparatus designed for its use, a first expansion chamber into which said liquefied gas may be introduced, a valve controlling the introduction of liquefied gas thereinto, a second expansion chamber in communication with the first expansion chamber, a valve therein controlling the introduction of gas from the first expansion chamber, means for introducing air into the gas as it travels from the second expansion chamber to the apparatus, said gas and air mixture being in counter-flow and heat-exchange relationship to the gas passing from the first expansion chamber to the second expansion chamber, and means for increasing the surface area of the partition between the gas and gaseous fuel while flowing in said heat-exchange relationship.

4. In combination with a liquefied gas supply, means for gasifying said liquid, comprising a conduit establishing communication between the source of liquefied gas supply and apparatus designed for its use, a conduit for liquefied gas, a first expansion chamber in communication therewith, a valve interrupting and controlling said communication, fluid responsive means associated with the valve and actuated by variation in fluid pressure within the expansion chamber, a second expansion chamber, a valve therein controlling the inlet of fluid thereto, a suction conduit from the first expansion chamber to the valved inlet of the second expansion chamber, fluid pressure responsive means in the second expansion chamber for actuating the valve therein, a fuel and air mixer, a conduit leading from said second expansion chamber to the fuel and air mixer and in heat exchange relationship to the conduit leading from the first expansion chamber to the valved inlet of the second expansion chamber, and a manifold connected with the air mixer and through which fluid is drawn by suction to draw the gaseous fuel from the source of liquefied gas through the two expansion chambers and the mixer to apparatus to be used.

5. In combination with a liquefied gas supply, means for gasifying said liquid, comprising a conduit establishing communication between the source of liquefied gas supply and apparatus designed for its use, a conduit for liquefied gas, a first expansion chamber in communication therewith, a valve interrupting and controlling said communication, fluid responsive means associated with the valve and actuated by variation in fluid pressure within the expansion chamber, a second expansion chamber, a valve therein controlling the inlet of fluid thereto, a suction conduit from the first expansion chamber to the valved inlet of the second expansion chamber, fluid pressure responsive means in the second expansion chamber for actuating the valve therein, a fuel and air mixer, a conduit leading from said second expansion chamber to the fuel and air mixer and in heat exchange relationship to the conduit leading from the first expansion chamber to the valved inlet of the second expansion chamber, and a manifold connected with the air mixer and through which fluid is drawn by suction to draw the gaseous fuel from the source of liquefied gas through the two expansion chambers and the mixer to apparatus to be used, said conduits being disposed in a plane between the two expansion chambers with said expansion chambers being arranged symmetrically at opposite sides thereof.

HAROLD W. SMITH.